US006165475A

United States Patent [19]
Crea et al.

[11] Patent Number: 6,165,475
[45] Date of Patent: Dec. 26, 2000

[54] WATER-SOLUBLE EXTRACT FROM OLIVES

[75] Inventors: Roberto Crea, San Mateo, Calif.; Luciano Caglioti, Rome, Italy

[73] Assignee: CreAgri, Inc., Hayward, Calif.

[21] Appl. No.: 09/491,680

[22] Filed: Jan. 26, 2000

Related U.S. Application Data

[63] Continuation-in-part of application No. 09/359,150, Jul. 22, 1999.
[60] Provisional application No. 60/093,818, Jul. 23, 1998.

[51] Int. Cl.[7] .................................................. A01N 65/00
[52] U.S. Cl. ............................................................ 424/195.1
[58] Field of Search .......................................... 424/195.1

[56] References Cited

U.S. PATENT DOCUMENTS

| | | |
|---|---|---|
| 4,370,274 | 1/1983 | Finch et al. . |
| 4,452,744 | 6/1984 | Finch et al. . |
| 4,522,119 | 6/1985 | Finch et al. . |
| 5,714,150 | 2/1998 | Nachman . |

FOREIGN PATENT DOCUMENTS

| | | |
|---|---|---|
| 581748 A1 | 2/1994 | European Pat. Off. . |
| 01276576 | 11/1997 | Italy . |
| 01278025 | 12/1997 | Italy . |
| 2006904 | 5/1989 | Spain . |
| WO 97/28089 | 8/1997 | WIPO . |

OTHER PUBLICATIONS

Computer Abstract FSTA 97(01): J0083 Limiroli et al "1H NMR study of phenolics in the vegetation water of three cultivars of Olea europaea" Journal of Agric. & Food Chem. (1996) 44 (8) 2040–2048,.

Computer Abstract FSTA 2000(01):N0049 Servili et al "High performance liquid chromatography evaluation of phenols in olive fruit, virgin olive oil, vvebetation waters, and pomace and 1D—and 2D–nmr charct" Jour of the Amer. Oil Chemists Soc. (1999) 76 (7),.

Computer Abstract Energy 1992(16): 116698 Amalfitano "Recovery and purification treatments of water coming from olive oil extraction processes Energy innovation and the Agro–food industry" Ed. Corte et al Conference: Mar. 21–23 1990, 1996.

Aziz, N.H., et al., "Comparative antibacterial and antifungal effects of some phenolic compounds" Microbios 93:43–54 (1998).

de la Puerta, et al., "Inhibition of Leukocyte 5–Lipoxygenase by Phenolics from Virgin Olive Oil" Biochemical Pharmacology 57:445–449 (1999).

Koutsoumanis, K., et al., "Modelling the effectiveness of a natural antimicrobial on Salmonella enteritidis as a function of concentration, temperature and pH, using conductance measurements" J. of Applied Microbiology 84:981–987 (1998).

Tassou, C.C. and Nychas, G.J.E., "Inhibition of Salmonella enteritidis by oleuropein in broth and in a model food system" Letters in Applied Microbiology 20:120–124 (1995).

Tranter, H.S., et al., "The effect of the olive phenolic compound, oleuropein, on growth and enterotoxin B production by Staphylococcus aureus" J. of Applied Bacteriology 74:253–259. (1993).

Visiolli, F., et al., "Free Radical–Scavenging Properties of Olive oil Polyphenols" Biochemical and Biophysical Research Communications 247:60–64 (1998).

Visioli, F., et al., "Oleuropein, the Bitter Principle of Olives Enhances Nitric Oxide Production by Mouse Macrophages" Life Sciences 62(6):541–546 (1998).

Primary Examiner—Herbert J. Lilling
Attorney, Agent, or Firm—Peter J. Dehlinger

[57] ABSTRACT

The invention provides a stable, olive-derived vegetation water substantially free of monophenolic compounds (e.g., tyrosol and its derivatives). The olive or seeds are removed from the olives prior to pressing. The pitless pulp or meat is then pressed to obtain a liquid-phase mixture including olive oil, vegetation water, and solid by-products. The vegetation water is separated from the rest of the liquid-phase mixture and collected, and stabilized for long term storage by acidification.

7 Claims, No Drawings

WATER-SOLUBLE EXTRACT FROM OLIVES

This application is a Continuation-in-Part of application Ser. No. 09/359,150 filed Jul. 22, 1999, which claims the benefit of U.S. provisional application no. 60/093,818 filed Jul. 23, 1998, which are hereby incorporated by reference.

FIELD OF THE INVENTION

This invention relates to a polyphenolic compound present in olive plants known as oleuropein. Particularly, the invention provides a process for the stabilization of waste water from olive oil production.

REFERENCES

Aziz, N. H., et al., Microbios. 93(374):43 (1998);

de la Puerta, et al., R. Biochem. Pharmacol. 57(4):445 (1999);

Koutsoumanis, K., et al, J. Appl. Microbiol. 84(6):981 (1998);

Tassou, C. C., et al., Lett. Appl. Microbiol. 20(2):120 (1995);

Tranter, H. S., et al., J. Appl. Bacteriol. 74(3):253 (1993);

Visioli, F., et al., Biochem. Biophys. Res. Commun. 247(1):60 (1998a);

Visioli, F., et al., Life Sci. 62(6):541 (1998b).

BACKGROUND OF THE INVENTION

The olive tree and other members of the family Oleaceae have been documented as a source of medicinal substances since biblical times. Many researchers have studied the cocktail of phytogenic substances produced by the olive and other members of this family. One compound that has received particular attention from the research community is a glucoside known as oleuropein. A number of scientific studies have shown this compound to have certain anti-viral, anti-fungal, and anti-bacterial properties (Koutsoumanis; et al., 1998; Aziz, et al., 1998; Tranter, et al., 1993; Tassou, et al., 1995), anti-oxidant properties (de la Puerta, et al., 1999; Visiola, 1998a), and anti-inflammatory properties (Visioli, et al., 1998b). Interest in natural anti-oxidants is increasing because of the growing body of evidence indicating the involvement of oxygen-derived free radicals in several pathologic processes, such as cancer and atherosclerosis.

Not surprisingly, the market for oleuropein is quite substantial. Dietary supplements containing oleuropein are readily obtainable via mail-order catalogs and the internet. Currently, most of the oleuropein commercially available to consumers is derived from olive leaves. To date, the fruit of the olive plant, which is rich in oleuropein, has largely been ignored as a source of oleuropein due to certain problems associated with the production of olive oil, discussed below.

Conventionally, olive oil production involves crushing olives, including the pits, to produce a thick paste. During this procedure, the crushed olives are continuously washed with water, a process known as "malaxation." The paste is then mechanically pressed to squeeze out the oil content. In addition to providing olive oil, the pressing also squeezes out the paste's water content. Such washing and pressing steps yield a considerable amount of water, referred to as "vegetation water."

Both the pit and the pulp of olives are rich in water-soluble, phenolic compounds. Such compounds are extracted from olives during malaxation, according to their partition coefficients, and end up in the vegetation water. This explains why various polyphenolic compounds, such as oleuropein and its derivatives, produced in olive pulp, can be found in abundance in vegetation waters. Similarly, a number of monophenolic compounds, such as tyrosol and its derivatives, produced in olive pits, are also abundant in vegetation waters.

Oleuropein and its derivatives are readily degraded into breakdown products (e.g., upon exposure to air/oxygen, certain enzymes or bacteria) that are substantially non-polluting and non-toxic. Tyrosol and its derivatives, on the other hand, are substantially resistant to air/oxygen, bacterial and enzymatic degradation and are of a highly polluting nature. Unfortunately, current technology does not permit the isolation of oleuropein and its derivatives from such highly polluting monophenolic compounds in vegetation waters except through time-consuming and expensive separation processes. For these reasons, vegetation waters are currently treated as waste and are discarded without realizing their content of oleuropein.

In some cases, for example when the use of vegetation water is targeted at liquid formulations, such as in beverages or other liquid formulations for agriculture pest control uses, it may be convenient to store the vegetation water at room temperature for extended periods. In particular, such storage should produce a minimum of air oxidation, polymerization of polyphenols, or bacterial growth that may lead to reduction and/or total loss of anti-oxidant activity of the waste water.

SUMMARY OF THE INVENTION

One aspect of the present invention provides a method of producing vegetation water from olives, the vegetation water containing oleuropein substantially free of monophenolic compounds from olive pits, comprising the steps of: separating olive pits from olives to obtain a pitless olive pulp; pressing the pitless olive pulp to obtain a liquid-phase mixture including water, oil, and olive pulp components; separating the water component from the oil and olive pulp components of the liquid-phase mixture to obtain a water component substantially free of oil and olive pulp; collecting the separated water component, and acidifying the water component to a pH between 2–4, to stabilize the component. The water component is preferably stabilized with an organic acid, such as citric acid.

Another aspect of the invention provides a composition, prepared according to the method of the invention, which comprises oleuropein substantially free of monophenolic compounds from olive pits.

These and other features and advantages of the present invention will become clear from the following description.

DETAILED DESCRIPTION OF THE INVENTION

One aspect of the present invention provides olive-derived vegetation water that is substantially free of monophenolic compounds from olive pits. To obtain such vegetation water, the invention provides for the removal of the pits or seeds from the olives prior to pressing. The pitless pulp or meat is then pressed to obtain a liquid-phase mixture including olive oil, vegetation water, and solid by-products. Thereafter, the vegetation water is separated from the rest of the liquid-phase mixture and collected.

It should be appreciated the vegetation water produced in this manner is substantially free of compounds that are found primarily in olive pits, such as tyrosol and other highly polluting, monophenolic compounds. The vegetation water thus obtained may be used, for example, in a variety of ways not amenable to conventional vegetation water. For example, vegetation water obtained by the method of the present invention can be used: (i) as a natural anti-bacterial, antiviral and/or fungicidal product for agricultural and/or pest control applications, (ii) as a raw material for the production of oleuropein and other anti-oxidants for a variety of medical purposes (e.g., holistic medicine), and (iii) as a therapeutic and/or an anti-oxidant beverage for a variety of health purposes.

According to one embodiment, a batch of olives is processed to remove the pit from each fruit. The pitless pulp is then mechanically pressed to yield a liquid-phase mixture including olive oil, vegetation waters, and solid by-products. The solid by-products are substantially removed from the liquid-phase mixture by filtration and/or centrifugation. Next, the oil and aqueous fractions are then allowed to segregate. The aqueous phase is then decanted and saved for further use.

In one embodiment, the pitless olive pulp is mixed with water or an alcohol/water solution to produce an extract substantially free of chemicals associated with the olive pits or seeds, such as tyrosol and its derivatives.

The vegetation water or extract may be concentrated by distillation under vacuum. The concentrate may be dried by spray drying or oven drying under vacuum to obtain a powder containing oleuropein. It may be desirable to conduct such steps at a temperature no greater than about 88 degrees Celsius to avoid degradation of the glucoside. The oleuropein can then be purified, for example, by chromatographic separation procedures. The oleuropein content may be tested by standard thin layer chromatography and high-pressure liquid chromatography methods.

Techniques suitable for concentrating and/or isolating oleuropein from aqueous and aqueous-alcoholic solutions are taught, for example, in U.S. Pat. No. 5,714,150, expressly incorporated herein by reference.

The olives processed according to the method disclosed herein may be pitted by any suitable means. The pits may be separated from the pulp manually or in an automated manner. Preferably, such means should be capable of segregating the pits without breaking them, which might otherwise cause sharp pieces to become embedded in the olive meat.

For purposes of commercial production, it may be desirable to automate various aspects of the invention. In this regard, one embodiment contemplates the use of an apparatus as disclosed in U.S. Pat. Nos. 4,452,744, 4,522,119 and 4,370,274, each to Finch et al., and each expressly incorporated herein by reference. Briefly, Finch et al. teach an apparatus for recovering olive oil from olives. Initially, olives are fed to a pulper that separates the olive pits from the olives to obtain a pitless olive meat. The meat is then taken up by an extraction screw that subjects the meat to an extraction pressure sufficient to withdraw a liquid phase, comprising oil, water and a minor proportion of olive pulp. The liquid phase is collected in a bin and then sent to a clarifying centrifuge that separates the pulp from the liquid phase to obtain a mixture comprising olive oil and water. A purifying centrifuge then separates the water and a small proportion of solid matter from the mixture to obtain an olive oil, substantially free of water, that is collected in a tank. According to Finch et al., the water is put to a disposal means such as a sewer. The present invention, in sharp contrast, provides for the collection, saving and use of the vegetation waters.

Additional devices that may be used in practicing the present invention are disclosed in Italian Patent Nos. 1276576 and 1278025, each expressly incorporated herein by reference. As above, these devices can be used to separate the pulp from the pits prior to processing of the crushed olive pulp into oil, water, and solid residues.

As previously described, a number of uses are contemplated for vegetation waters obtained in accordance with the method of this invention. In one exemplary embodiment, the vegetation water, or a concentrate or isolate thereof, is administered to a mammalian subject, such as a person desirous of one or more of the benefits associated with oleuropein.

The oleuropein obtained by the method of the invention can be administered orally or parenterally. Oral dosage forms can be in a solid or liquid form. Such dosage forms can be formulated from purified oleuropein or they can be formulated from aqueous or aqueous-alcoholic extracts. Regarding the latter, aqueous or aqueous-alcoholic (e.g., water-methanol or water-ethanol) extracts can be spray-dried to provide a dry powder that can be formulated into oral dosage forms with other pharmaceutically acceptable carriers.

The solid oral dosage form compositions in accordance with this invention are prepared in a manner well known in the pharmaceutical arts, and comprise oleuropein in combination with at least one pharmaceutically acceptable carrier. In making such compositions, oleuropein, either in substantially pure form or as a component of a raw distillate or extract, are usually mixed, diluted or enclosed with a carrier. The carrier can be in a solid form, semi-solid or liquid material which acts as a vehicle, carrier or medium for the active ingredient. Alternatively, the carrier can be in the form of a capsule or other container to facilitate oral administration. Thus, the solid oral dosage forms for administration in accordance with the present invention can be in the form of tablets, pills, powders or soft or hard gelatin capsules.

Alternatively, the oleuropein obtained in accordance with this invention for oral administration can be in liquid form wherein the pharmaceutically acceptable carrier is water or an aqueous-alcoholic medium.

The compositions for administration in the present invention can also be formulated with other common pharmaceutically acceptable excipients, including lactose, dextrose, sucrose, sorbitol, mannitol, starches, gums, calcium silicate, microcrystalline cellulose, polyvinylpyrrolidone, methylcellulose, water, alcohol and the like. The formulations can additionally include lubricating agents such as talc, magnesium stearate and mineral oil, wetting agents, emulsifying and suspending agents, preserving agents such as methyl- and propylhydroxybenzoates, sweetening agents or flavoring agents. Further, the compositions of the present invention can be formulated so as to provide quick, sustained or delayed release of the active ingredient after administration to a subject.

Parenteral formulations for use in accordance with the present invention are prepared using standard techniques in the art. They are commonly prepared as sterile injectable solutions, using a parenterally acceptable carrier such as isotonic saline solution or as a sterile packaged powder prepared for reconstitution with sterile buffer or isotonic saline prior to administration to a subject.

Improved Stabilization by Acidification of Vegetation Water

According to an important feature of the invention, and as detailed in the Example below, it has been discovered that acidifying the vegetation water enhances storage stability, e.g., extended storage at room temperature for several weeks, and leads to desirable hydrolysis products such as elenolic acid and 2-(3,4-dihydroxyphenyl)ethanol (DPF) with strong antioxidant and antibacterial activity.

The water is acidified by addition of acid to a pH between 2 and 4, e.g. between 2 and 2.4 or 3.5 or 4. The acidifying acid is preferably an organic acid, such as citric or carbonic acid, preferably citric acid.

EXAMPLE

This process can be accomplished by adding solid citric acid under continues stirring in quantity equivalent to 25 lb–50 lb of solid acid to ca. 1200 liter waste water. The pH of the resulting solution can be monitored, and further addition of acid may be necessary to achieve the desired pH.

In a plastic tote (capacity 1250 liters), waste water was collected directly form the centrifuge, at a flow rate of about 60 gal/min. After ca. 15 min., solid citric acid was poured into the collection tank and the solution stirred continuously. The addition of acid was completed in ca. 15 minutes. Two different concentrations were adopted to monitor the stabilization, the first involving the addition of ca. 50 lb in 1200 liter waste water, the second half of the above amount, i.e. 25 lb. in 1200 liters. After ca. one hour from the addition of the acid, samples of the two solutions were collected and checked for pH acidity. In the first case, the acidity was ca. 3.5–4.0 while in the second case 2.0–2.5. The solutions were stored at room temperature (ca. 18 C.) for further analysis.

From the foregoing, various objects and features of the invention can be appreciated. The acidification step enhances the stability of the vegetation water, reducing loss of anti-oxidants and other valuable compounds on storage, e.g., at room temperature. Specifically, the hydrolysis of large precursors in the water, such as oleuropein and members of the hydroxytyrosol family, all components that contain an ester moiety, leads to phenol derivatives of smaller molecular weight. Such phenols have been recently shown to have higher antioxidant activity than their high molecular weight precursors.

Those skilled in the art can now appreciate from the foregoing description that the broad teachings of the present invention can be implemented in a variety of forms. Therefore, while this invention has been described in connection with particular embodiments and examples thereof, the true scope of the invention should not be so limited. Various changes and modification may be made without departing from the scope of the invention, as defined by the appended claims.

It is claimed:

1. A method of producing and stabilizing vegetation water from olives, said vegetation water containing oleuropein substantially free of monophenolic compounds from olive pits, comprising separating olive pits from olives to obtain a pitless olive pulp;

pressing the pitless olive pulp to obtain a liquid-phase mixture including water, oil, and olive pulp components;

separating the water component from the oil and olive pulp components of the liquid-phase mixture to obtain a water component substantially free of oil and olive pulp;

collecting the separated water component;

acidifying the separated water component to lower the pH of the separated water component from about 6.0 to between 2.0 to 4.0.

2. The method of claim 1 wherein said acidifying step is carried out by adding an organic acid to the separated water component.

3. The method of claim 2, wherein the acid is citric acid.

4. The method of claim 1, further comprising removing moisture from the acidified water component to obtain an increased concentration of oleuropein.

5. The method of claim 1, further comprising drying the separated, acidified water component to obtain a powder containing oleuropein.

6. The method of claim 5, further comprising encapsulating the powder containing oleuropein into a gelatin capsule.

7. A composition prepared according to the method of claim 1, which comprises oleuropein substantially free of monophenolic compounds from olive pits.

\* \* \* \* \*